Patented May 19, 1942

2,283,342

UNITED STATES PATENT OFFICE 2,283,342

VULCANIZATION OF RUBBER

Bernard M. Sturgis, Pitman, N. J., assignor to E. I. du Pont de Nemours & Company, Wilmington, Del., a corporation of Delaware No Drawing. Application July 25, 1940, Serial No. 347,476

25 Claims. (Cl. 260—786)

This invention relates to the vulcanization of rubber and more particularly to new combinations of accelerators for the vulcanization of rubber.

It has been proposed to accelerate the vulcanization of rubber with a combination of accelerators of which one is designated the primary accelerator and the other is designated a secondary accelerator. The purpose of the secondary accelerator is generally to activate the primary accelerator. The use of secondary accelerators, as activators for acidic type primary accelerators such as the mercapto-thiazoles, has presented particularly difficult problems due to the tendency of such combinations to prevulcanize or "scorch" the rubber during processing operations. This is particularly true when it is attempted to use a dithiocarbamate as the secondary accelerator. In general, it has been found impossible to use a dithiocarbamate accelerator as a secondary accelerator with an acidic primary accelerator, such as the mercapto-thiazoles and particularly 2-mercaptobenzothiazole, because of the great activity of such combinations of accelerators. Generally, such combinations of dithiocarbamates and mercapto-thiazoles render the rubber incapable of being processed due to its tendency to prevulcanize or scorch. Furthermore, combinations of dithiocarbamates with mercapto-thiazoles and other similar acidic accelerators have been found to impart inferior physical properties to the rubber. The resulting vulcanizates are generally poor in resistance to abrasion and in resistance to aging. Further, such combinations of accelerators usually cause bad reversion of the rubber at the longer cures, which is accompanied by a loss in tensile strength and a deterioration of the physical properties in general.

It is an object of the present invention to provide an improved method of vulcanizing rubber. Another object is to provide vulcanized rubber of improved properties. A further object is to improve the vulcanization of rubber by employing, as accelerators therein, new combinations of accelerators which are sufficiently safe at processing temperatures for commercial utilization and which are at the same time very active at normal vulcanization tempertaures. A still further object is to provide a new combinations of accelerators for the vulcanization of rubber which produces vulcanized rubber of improved properties. Other objects are to provide new compositions of matter and to advance the art. Still other objects will appear hereinafter.

The above and other objects may be accomplished in accordance with my invention, which comprises employing, as accelerators for the vulcanization of rubber, a 2-mercapto-thiazoline accelerator, as a primary accelerator and an accelerating substituted ammonium salt of a dithiocarbamic acid, as a secondary accelerator. I have found that, when such accelerators are employed together for accelerating the vulcanization of rubber, novel results are obtained, which are different than would be expected from the results which have been obtained when it has been attempted to employ dithiocarbamates with mercapto-thiazoles, such as 2-mercapto-benzothiazole, and similar acidic type accelerators. I have found that the 2-mercapto-thiazoline accelerators can be activated with substituted ammonium salts of dithiocarbamic acids so that stocks will be obtained which can be processed safely but which give very fast cures at the usual vulcanizing temperatures producing vulcanizates possessing exceptionally good moduli and tensile properties. In general, the curing curves show a remarkable plateau effect and the vulcanizates show no reversion, the physical properties standing up well on the longer cures. Moreover, rubber, vulcanized by the joint employment of the accelerators of my invention, shows remarkable resistance to deterioration. In particular, it is resistant to that deterioration normally caused by exposure to high temperatures. Vulcanized rubber compounds, prepared in accordance with my invention, also possess excellent resistance to abrasion, excellent resistance to flex-cracking and excellent resistance to tear, both at ordinary atmospheric temperatures and at higher temperatures. The tensiles, determined at 100° C., are excellent.

The substituted ammonium dithiocarbamates of my invention may be represented by the formula

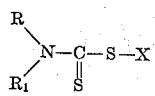

wherein X represents a substituted ammonium salt forming group, R represents hydrogen or an organic radical and $R_1$ represents an organic radical. While either or both of R and $R_1$ may represent aromatic radicals, preferably, at least one of R and $R_1$ represents an aliphatic and, particularly, an alkyl radical. I generally prefer that R and $R_1$ each represents an aliphatic and, specifically, an alkyl radical. I particularly prefer that R and R₁ together represent a carbon chain having the terminal carbon atoms of the chain directly bonded to the nitrogen to form a heterocyclic ring, such as pentamethylene and hexamethylene. The substituted ammonium salts of dithiocarbamic acids, which may be employed in accordance with my invention, include the amine salts and the diaryl guanidine salts of the various dithiocarbamic acids. When the amine salts are employed, the amines will be preferably secondary amines and particularly those in which two valences of the nitrogen are satisfied by the terminal carbon atoms of a carbon chain, preferably of 5 to 6 carbon atoms, so as to form a heterocyclic ring with the nitrogen, such as pentamethylene (piperidine) and hexamethylene. In some cases, I prefer that the substituted ammonium salt forming group be derived from a diaryl guanidine, such as diphenyl, ditolyl and dixylyl guanidines. The dialkyl amines also form very desirable substituted ammonium salt forming groups.

By the term "alkyl," as employed hereinafter and in the claims, I mean an aliphatic radical which consists of carbon and hydrogen and which contains no aromatic rings. By the term "aliphatic," I mean that the radical may contain aromatic, as well as non-hydrocarbon substituents. By the term "aryl," I mean an aromatic radical, consisting of carbon and hydrogen, in which the free valence belongs to a carbon in a benzene ring. By the term "aromatic," I intend to include radicals having non-hydrocarbon substituents on the benzene rings thereof. When I use expressions, such as "substituted ammonium salt of a dithiocarbamic acid derived from a secondary amine," it will be understood that, except where specifically indicated otherwise, the phrase beginning with "derived" refers to the dithiocarbamic acid and not to the basic salt forming group. By an "accelerator" and an "accelerating" salt, I mean that the designated compound is one which is operable alone to accelerate the vulcanization of rubber, i. e., in the absence of another organic accelerator.

In order to illustrate the remarkable properties that can be obtained when rubber is treated according to my invention, results of tests, in which combinations of substituted ammonium salts of dithiocarbamic acids with 2-mercapto-thiazolines have been used, are here described. The following stocks were compounded and used for these tests.

|  | Stock | | |
|---|---|---|---|
|  | A | B | C |
| Smoked sheets | 100 | 100 | 100 |
| Channel black | 25 | 25 | 25 |
| Zinc oxide | 5 | 5 | 5 |
| Stearic acid | 3 | 3 | 3 |
| Sulfur | 3 | 3 | 3 |
| 2-mercapto-thiazoline | 0.5 | 0.5 | 0.5 |
| Pentamethylene ammonium pentamethylene dithiocarbamate | | 0.1 | |
| Hexamethylene ammonium hexamethylene dithiocarbamate | | | 0.05 |

The results of these tests are given in Table I.

TABLE I

| Min. cured | Temp. cured | Modulus at 600% elongation | | | Tensile at break | | |
|---|---|---|---|---|---|---|---|
|  |  | Stock A | Stock B | Stock C | Stock A | Stock B | Stock C |
|  | °F. |  |  |  |  |  |  |
| 30 | 227 | 225 | 350 | No cure | 475 | 525 | No cure |
| 45 | 227 | 325 | 750 | 425 | 525 | 1,025 | 825 |
| 20 | 274 | 1,875 | 2,825 | 2,600 | 2,925 | 4,225 | 3,550 |
| 30 | 274 | 2,550 | 3,475 | 3,375 | 3,025 | 4,950 | 4,475 |
| 45 | 274 | 3,075 | 3,875 | 3,825 | 4,425 | 5,075 | 4,600 |
| 60 | 274 | 3,350 | 4,100 | 3,975 | 4,850 | 4,825 | 4,450 |

It can be seen from these tests that, if a small amount of a substituted ammonium salt of a dithiocarbamic acid is added to a stock containing 2-mercapto-thiazoline, the modulus and tensile figures at curing temperatures are considerably increased. Even though this class of compounds is considered among the most active as rubber accelerators, yet its members can be used with safety in combination with a 2-mercapto-thiazoline. This is illustrated by Stocks B and C which show no tendency to prevulcanize during processing. Even though a great amount of activation is imparted to the 2-mercapto-thiazoline at 274° F., yet no reversion is present in the modulus, but rather it steadily increases throughout the cure.

In order to show that the results, obtained above, are not limited to the particular test formula used, the following stocks were prepared.

|  | Stock | | | | | |
|---|---|---|---|---|---|---|
|  | D | E | F | G | H | I |
| Smoked sheets | 100 | 100 | 100 | 100 | 100 | 100 |
| Zinc oxide | 5 | 5 | 5 | 5 | 5 | 5 |
| Stearic acid | 3 | 3 | 3 | 3 | 3 | 3 |
| Sulfur | 3 | 3 | 3 | 3 | 3 | 3 |
| 2-mercapto-thiazoline | 0.5 | 0.5 | 0.5 | 0.5 | 0.5 | 0.5 |
| Di-lauryl ammonium di-lauryl dithiocarbamate | | 0.1 | | | | |
| Cyclohexyl ammonium cyclohexyl dithiocarbamate | | | 0.1 | | | |
| Dibenzyl ammonium dibenzyl dithiocarbamate | | | | 0.1 | | |
| Diallyl ammonium diallyl dithiocarbamate | | | | | 0.1 | |
| Hexamethylene ammonium hexamethylene dithiocarbamate | | | | | | 0.05 |

Results of tests on these stocks are given in Table II.

TABLE II

| Min. cured | Temp. cured | Stock D | Stock E | Stock F | Stock G | Stock H | Stock I |
|---|---|---|---|---|---|---|---|
| MODULUS AT 600% ELONGATION, LBS./SQ. IN. | | | | | | | |
| | °F. | | | | | | |
| 30 | 227 | 25 | 75 | 275 | 25 | 175 | 250 |
| 20 | 274 | 675 | 1,075 | 1,325 | 1,000 | 1,175 | 1,525 |
| 30 | 274 | 925 | 1,625 | 1,800 | 1,275 | 1,475 | 1,925 |
| 45 | 274 | 1,275 | 1,975 | 2,150 | 1,725 | 1,825 | 2,400 |
| 60 | 274 | 1,450 | 2,175 | 2,500 | 2,025 | 1,925 | 2,550 |
| TENSILE AT BREAK, LBS./SQ. IN. | | | | | | | |
| 30 | 227 | 475 | 375 | 1,325 | 650 | 1,075 | 1,050 |
| 20 | 274 | 2,625 | 3,400 | 3,575 | 2,900 | 3,775 | 3,675 |
| 30 | 274 | 3,250 | 3,975 | 3,850 | 3,700 | 4,500 | 3,925 |
| 45 | 274 | 3,725 | 3,800 | 3,775 | 3,675 | 4,625 | 3,975 |
| 60 | 274 | 3,850 | 3,825 | 3,800 | 3,800 | 4,525 | 3,975 |

It is apparent that, in gum stocks also, the addition of a small amount of a substituted ammonium salt of a dithiocarbamic acid to a 2-mercapto-thiazoline, gives a great increase in modulus at 274° F. without causing reversion and without causing the stocks to lose the required processing safety. The use of smaller amounts of activator, than those given in the table, will still give a large increase in modulus at 274° F. but will render the stocks even safer.

In order to show the superiority of stocks, containing a substituted ammonium salt of a dithiocarbamic acid in which a 2-mercapto-thiazoline is used as the primary accelerator, over those in which 2-mercapto-benzo-thiazole is used as the primary accelerator, the following tests were made.

| | Stock J | Stock K |
|---|---|---|
| Smoked sheets | 100 | 100 |
| Zinc oxide | 5 | 5 |
| Stearic acid | 3 | 3 |
| Sulfur | 3 | 3 |
| 2-mercapto-thiazoline | 0.5 | |
| 2-mercapto-benzo-thiazole | | 0.5 |
| Hexamethylene ammonium hexamethylene dithiocarbamate | 0.1 | 0.1 |

These stocks were cured for 20 minutes at 274° F. and the modulus and tensile properties then determined. Stock J, in which 2-mercapto-thiazoline was used, had a modulus at 600% elongation of 1950 lbs./sq. in. and a tensile strength of 3700 lbs./sq. in. Stock K, however, in which 2-mercapto-benzo-thiazole was used, broke at 300% elongation and had a tensile at break of only 375 lbs./sq. in. This illustrates the fact that a substituted ammonium salt of a dithiocarbamate readily produces a highly overcured condition, when used with an accelerator such as 2-mercapto-benzo-thiazole, but, under the same conditions, when used with a 2-mercapto-thiazoline, will produce a vulcanizate with desirable physical properties.

Another class of substituted ammonium salts of dithiocarbamic acids, which produces excellent results when used in conjunction with a 2-mercapto-thiazoline, consists of the guanidine salts of dithiocarbamic acids. The following tests illustrate their desirability.

| | Stock D | Stock L | Stock M |
|---|---|---|---|
| Smoked sheets | 100 | 100 | 100 |
| Zinc oxide | 5 | 5 | 5 |
| Stearic acid | 3 | 3 | 3 |
| Sulfur | 3 | 3 | 3 |
| 2-mercapto-thiazoline | 0.5 | 0.5 | 0.5 |
| Di-phenyl-guanidine salt of dimethyl dithiocarbamic acid | | 0.25 | |
| Di-phenyl-guanidine salt of pentamethylene dithiocarbamic acid | | | 0.25 |

TABLE III

| Min. cured | Temp. cured | Modulus at 600% elongation | | | Tensile at break | | |
|---|---|---|---|---|---|---|---|
| | | Stock D | Stock L | Stock M | Stock D | Stock L | Stock M |
| 20 | °F. 274 | 675 | 1,275 | 1,575 | 2,625 | 3,775 | 4,275 |
| 30 | 274 | 925 | 2,000 | 2,050 | 3,250 | 4,275 | 4,275 |
| 45 | 274 | 1,275 | 2,225 | 2,475 | 3,725 | 3,875 | 4,475 |
| 60 | 274 | 1,450 | 2,350 | 2,575 | 3,850 | 4,075 | 4,300 |

It can be seen, from Table III, that guanidine salts of dithiocarbamic acids act as powerful activators for 2-mercapto-thiazolines, yet do not cause reversion in either the modulus or tensile strength. No difficulty was experienced in processing any of these stocks.

Not only do the vulcanizates, prepared according to my invention, possess excellent modulus and tensile properties, freedom from reversion, and processing safety, but they are also characterized by many other valuable properties which make them desirable commercial vulcanizates.

One property of vulcanized rubber, which is very important for many applications such as the construction of inner tubes for tires, is its resistance toward tearing. Vulcanizates, prepared according to my invention, have very excellent tear resistance as shown in Table IV. This excellent tear resistance cannot be obtained by combinations of substituted ammonium salts of dithiocarbamic acids with mercapto-thiazoles since an overcured condition generally results which causes a deterioration of physical properties. The following stocks were used for these tests.

| | Stock D | Stock N |
|---|---|---|
| Smoked sheets | 100 | 100 |
| Zinc oxide | 5 | 5 |
| Stearic acid | 3 | 3 |
| Sulfur | 3 | 3 |
| 2-mercapto-thiazoline | 0.5 | 0.5 |
| Hexamethylene ammonium hexamethylene dithiocarbamate | | 0.04 |

TABLE IV

Tear test at 28° C.

| Min. cured at 274° F. | Stock D | Stock N |
|---|---|---|
| 20 | 17 | 22½ |
| 30 | 21 | 25 |
| 45 | 24 | 24 |
| 60 | 25 | 23½ |
| 90 | 24½ | 23 |

These tests show that, although the modulus is greatly increased by the addition of the secondary accelerator, the stocks are not overcured, since the tear test is equal or superior to that given by the primary accelerator alone.

The ability of rubber to stand up under high temperatures, while in service, is becoming increasingly more important. The rubber industry is therefore desirous of obtaining a rubber vulcanizate, having high modulus and tensile figures, which will also be resistant to conditions of high temperature without deterioration. The combinations of accelerators of this invention will provide these desired characteristics. This is illustrated by the test results given in Table V in which the results of tensile strength determinations, made at 100° C. on stock N, are presented.

TABLE V

*Tensiles at break lbs./sq. in.*

| Min. cured at 274° F. | Tested at 28° C. | Tested at 100° C. |
|---|---|---|
| 20 | 3,475 | 2,575 |
| 30 | 4,000 | 3,500 |
| 45 | 3,950 | 3,875 |
| 60 | 3,800 | 3,575 |
| 90 | 3,675 | 3,175 |

Rubber, vulcanized with substituted ammonium salts of dithiocarbamic acids as accelerators, is notoriously poor in age and heat resistance. This poor resistance toward deterioration carries over into stocks in which these dithiocarbamates are used as activators for mercapto-thiazoles and other similar types of accelerators. These combinations of accelerators are therefore valueless for the preparation of most commercial stocks.

It has been found, however, that, when these dithiocarbamates are used as activators for 2-mercapto-thiazolines in accordance with my invention, this deterioration in age and heat resistance is not present. The resulting vulcanizates withstand deterioration to a remarkable degree, as is illustrated by the results given in Table VI. The tests, recorded in this table, were carried out on the following stocks.

|  | Stock | | |
|---|---|---|---|
|  | O | P | Q |
| Smoked sheets | 100 | 100 | 100 |
| Zinc oxide | 5 | 5 | 10 |
| Stearic acid | 2 | 2 | 2 |
| Sulfur | 3 | 3 | 2.75 |
| Phenyl beta-naphthylamine | 1 | 1 | 1 |
| 2-mercapto-thiazoline |  | 0.75 |  |
| 2-mercapto-benzo-thiazole |  |  | 0.85 |
| Zinc hexamethylene dithiocarbamate | 0.2 |  |  |
| Hexamethylene ammonium hexamethylene dithiocarbamate |  | 0.025 |  |

These stocks were cured for 60 minutes at 259° F. and then aged by suspending in an air oven at 100° C. for two days, and also by suspending them in an oxygen bomb at 300 pounds oxygen pressure at 70° C. for 14 days. In Table VI are given the original moduli at 500% elongation and tensiles at break, and also the tensiles after the completion of both aging tests.

TABLE VI

| Stock | Original | | After 2 days in 100° C. oven, tensile | After 14 days in 70° C. oxygen bomb, tensile |
|---|---|---|---|---|
|  | 500% modulus | Tensile |  |  |
| O | 650 | 3,225 | 175 | 450 |
| P | 875 | 3,225 | 2,550 | 2,825 |
| Q | 900 | 4,050 | 275 | 2,725 |

Tests on stock O show the typical poor aging obtained by the use of dithiocarbamate accelerators. In stock Q, 2-mercapto-benzo-thiazole was used as representing one of the best aging accelerators known. Dinsmore and Vogt—Trans. I. R. I. vol. 4, page 98, show clearly that 2-mercapto-benzo-thiazole and para-nitroso-dimethyl-aniline are the only two, of a large number of commercial accelerators tested, which also acted as antioxidants. Furthermore, Barron, in the book "Modern Rubber Chemistry"—Hutchinson (1937) on page 194, states that 2-mercapto-benzo-thiazole "has a profound retarding effect on aging." Also Cadwell and Temple, on page 300 of their chapter on Accelerators in the book "Chemistry and Technology of Rubber" by Davis and Blake, state "Mercapto-benzo-thiazole itself is also an excellent antioxidant, so that compounds in which it is used age unusually well." In view of these statements, which have been repeatedly borne out by the rubber industry, it was quite unexpected that stock P, in which a combination of a substituted ammonium salt of a dithiocarbamic acid is used together with a 2-mercapto-thiazoline, should be so greatly superior in resistance to aging in the 100° C. oven and even superior in resistance to aging in the oxygen bomb to stock Q, in which 2-mercapto-benzo-thiazole was used as the accelerator. It therefore appears that rubber vulcanizates, prepared according to my invention, are extremely valuable to the rubber industry since they resist deterioration better than the accelerator formerly adopted as the standard.

Besides the above described valuable properties of vulcanizates prepared by the accelerator combinations of my invention, these vulcanizates also possess very good resistance to abrasion, flex-cracking, and heat build-up.

Although certain definite combinations of accelerators have been shown, these combinations are illustrative rather than limiting. A great many 2-mercapto-thiazolines may be used as the primary accelerator with good results. These include carbon substituted 2-mercapto-thiazolines, in which one or both of the hydrogen atoms in the 4 or 5 or both the 4 and 5 positions of the ring are substituted by alkyl groups or hydroxy alkyl groups, as illustrated by the formula

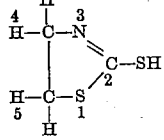

Examples of these are:
4-methyl-2-mercapto-thiazoline
4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4-methyl-5-propyl-2-mercapto-thiazoline
4,4-dimethyl-5-propyl-2-mercapto-thiazoline
4-isopropyl-5-propyl-2-mercapto-thiazoline
4-ethyl-5-propyl-2-mercapto-thiazoline
4-methyl-5-hydroxymethyl-2-mercapto - thiazoline
4-methyl-4-ethyl-5-propyl-2-mercapto - thiazoline
4-ethyl-5-methyl-2-mercapto-thiazoline
4-propyl-5-propyl-2-mercapto-thiazoline
4,5-dimethyl-2-mercapto-thiazoline
4-hydroxyethyl-2-mercapto-thiazoline
4,4,5,5-tetramethyl-2-mercapto-thiazoline Also, various metal salts of these 2-mercapto-thiazolines may be used effectively. These include, among others, Lead salt of 2-mercapto-thiazoline
Cadmium salt of 2-mercapto-thiazoline
Zinc salt of 2-mercapto-thiazoline
Iron salt of 2-mercapto-thiazoline
Zinc salt of 4-methyl-2-mercapto-thiazoline
Cadmium salt of 4-methyl-2-mercapto-thiazoline
Zinc salt of 4-ethyl-2-mercapto-thiazoline
Lead salt of 4-propyl-2-mercapto-thiazoline
Cadmium salt of 4,4-dimethyl-2-mercapto-thiazoline
Iron salt of 5,5-dimethyl-2-mercapto-thiazoline
Zinc salt of 4-methyl-4-ethyl-2-mercapto-thiazoline
Cadmium salt of 4,4-dimethyl-5-propyl-2-mercapto-thiazoline
Zinc salt of 4-hydroxyethyl-2-mercapto-thiazoline
Zinc salt of 4,4,5,5-tetramethyl-2-mercapto-thiazoline Likewise, the substituted ammonium salts of dithiocarbamic acids, used in the tests, are only a few of the large number that have been tested and which show good results. Among these are—

Dimethyl ammonium dimethyl dithiocarbamate
Diethyl ammonium diethyl dithiocarbamate
Dipropyl ammonium dipropyl dithiocarbamate
Dibutyl ammonium dibutyl dithiocarbamate
Diamyl ammonium diamyl dithiocarbamate
Diallyl ammonium diallyl dithiocarbamate
o-Methyl cyclohexyl ammonium o-methyl cyclohexyl dithiocarbamate
o-Chloro cyclohexyl ammonium o-chloro cyclohexyl dithiocarbamate
o-Hydroxy cyclohexyl ammonium o-hydroxy cyclohexyl dithiocarbamate
Dicyclohexyl ammonium dicyclohexyl dithiocarbamate
Ethyl cyclohexyl ammonium ethyl cyclohexyl dithiocarbamate
Methyl ethyl ammonium methyl ethyl dithiocarbamate
Furfuryl ammonium furfuryl dithiocarbamate
Tetrahydrofurfuryl ammonium tetrahydrofurfuryl dithiocarbamate
Lauryl ammonium lauryl dithiocarbamate
alpha-Methyl pentamethylene ammonium alpha-methyl pentamethylene dithiocarbamate
Ammonium dibutyl dithiocarbamate
Butyl pyridinium dimethyl dithiocarbamate
Tetramethyl ammonium dimethyl dithiocarbamate
Triphenyl guanidine salt of dimethyl dithiocarbamic acid
Di-ortho-tolyl guanidine salt of hexamethylene dithiocarbamic acid The combination of accelerators, employed in accordance with my invention, will generally comprise from about 1 to 100 parts of the primary accelerator for each part of the secondary accelerator, and preferably from about 2 to about 50 parts of the primary accelerator for each part of the secondary accelerator.

Compounding ingredients and fillers, other than those shown in the test formulae and in other proportions, may also be used.

The combinations of accelerators herein described, namely combinations of substituted ammonium salts of dithiocarbamic acids with 2-mercapto-thiazolines, are capable of producing highly desirable types of vulcanized rubber.

These combinations produce stocks having very high moduli and tensiles, a fast flat cure at ordinary curing temperatures, and freedom from reversion. These qualities are not obtained at the expense of processing safety, as the stocks have little tendency to prevulcanize or "scorch." The vulcanized rubber, prepared according to my invention, has also exceedingly good resistance toward tear, abrasion, flex-cracking, and heat build-up. Another characteristic of great value is the great resistance shown by these vulcanizates against deterioration by heat or oxidation. On the whole, the combination of desirable properties, produced by the mixtures of accelerators of my invention, is one that is very difficult to duplicate with any other known accelerator or mixture of accelerators.

I claim:

1. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid, as a secondary accelerator, there being from about 1 to about 100 parts of the primary accelerator to each part of the secondary accelerator.

2. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid derived from a secondary amine, as a secondary accelerator, there being from about 1 to about 100 parts of the primary accelerator to each part of the secondary accelerator.

3. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid derived from a secondary amine in which at least one radical attached to the nitrogen is an aliphatic radical, as a secondary accelerator, there being from about 1 to about 100 parts of the primary accelerator to each part of the secondary accelerator.

4. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid derived from a secondary amine in which two valences of the nitrogen are satisfied by the terminal carbon atoms of a single carbon chain, as a secondary accelerator, there being from about 1 to about 100 parts of the primary accelerator to each part of the secondary accelerator.

5. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid derived from a secondary amine in which two valences of the nitrogen are satisfied by the terminal carbon atoms of a single hydrocarbon chain of 5 to 6 carbon atoms, as a secondary accelerator, there being from about 2 to about 50 parts of the primary accelerator to each part of the secondary accelerator.

6. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dialkyl dithiocarbamic acid, as a secondary accelerator, there being from about 2 to about 50 parts of the primary accelerator to each part of the secondary accelerator.

7. Rubber having incorporated therein, prior to vulcanization, an accelerator of the group consisting of 2-mercapto-thiazolines and metal salts thereof in which the valences of the metals are satisfied by 2-mercapto-thiazoline radicals only, as primary accelerator, and an accelerating substituted ammonium salt of a pentamethylene dithiocarbamic acid, as a secondary accelerator, there being from about 2 to about 50 parts of the primary accelerator to each part of the secondary accelerator.

8. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid in which the ammonium group is derived from a secondary amine, as a secondary accelerator, there being from about 1 to about 100 parts of the primary accelerator to each part of the secondary accelerator.

9. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid in which the ammonium group is derived from a secondary amine having two valences of the nitrogen satisfied by the terminal carbon atoms of a single carbon chain, as a secondary accelerator, there being from about 1 to about 100 parts of the primary accelerator to each part of the secondary accelerator.

10. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating substituted ammonium salt of a dithiocarbamic acid in which the ammonium group is derived from a secondary amine having two valences of the nitrogen satisfied by the terminal carbon atoms of a single hydrocarbon chain of 5 to 6 carbon atoms, as a secondary accelerator, there being from about 1 to about 100 parts of the primary accelerator to each part of the secondary accelerator.

11. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating dialkyl ammonium salt of a dithiocarbamic acid, as a secondary accelerator, there being from about 1 to about 100 parts of the primary accelerator to each part of the secondary accelerator.

12. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a dialkyl ammonium salt of a dithiocarbamic acid derived from a secondary amine, as a secondary accelerator, there being from about 1 to about 100 parts of the primary accelerator to each part of the secondary accelerator.

13. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating pentamethylene ammonium salt of a dithiocarbamic acid, as a secondary accelerator, there being from about 1 to about 100 parts of the primary accelerator to each part of the secondary accelerator.

14. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating subtituted ammonium salt of a dithiocarbamic acid in which the dithiocarbamic acid and the ammonium group are both derived from a secondary amine having two valences of the nitrogen satisfied by the terminal carbon atoms of a single carbon chain, as a secondary accelerator, there being from about 1 to about 100 parts of the primary accelerator to each part of the secondary accelerator.

15. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and diethyl ammonium diethyl dithiocarbamate, as a secondary accelerator, there being from about 1 to about 100 parts of the primary accelerator to each part of the secondary accelerator.

16. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and pentamethylene ammonium pentamethylene dithiocarbamate, as a secondary accelerator, there being from about 1 to about 100 parts of the primary accelerator to each part of the secondary accelerator.

17. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating diaryl guanidine salt of a dithiocarbamic acid, as a secondary accelerator, there being from about 1 to about 100 parts of the primary accelerator to each part of the secondary accelerator.

18. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating diaryl guanidine salt of a dithiocarbamic acid derived from a secondary amine, as a secondary accelerator, there being from about 1 to about 100 parts of the primary accelerator to each part of the secondary accelerator.

19. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating diaryl guanidine salt of a dithiocarbamic acid derived from a secondary amine in which two valences of the nitrogen are satisfied by the terminal carbon atoms of a single carbon chain, as a secondary accelerator, there being from about 1 to about 100 parts of the primary accelerator to each part of the secondary accelerator.

20. Rubber having incorporated therein, prior to vulcanization, 2-mercapto-thiazoline, as a primary accelerator, and an accelerating substituted ammonium salt of a dithiocarbamic acid, as a secondary accelerator, there being from about 1 to about 100 parts of the primary accelerator to each part of the secondary accelerator.

21. Rubber having incorporated therein, prior to vulcanization, 2-mercapto-thiazoline, as a primary accelerator, and an accelerating substituted ammonium salt of a dithiocarbamic acid derived from a secondary amine in which two valences of the nitrogen are satisfied by the terminal carbon atoms of a single hydrocarbon chain of 5 to 6 carbon atoms, as a secondary accelerator, there being from about 2 to about 50 parts of the primary accelerator to each part of the secondary accelerator.

22. Rubber having incorporated therein, prior to vulcanization, 2-mercapto-thiazoline, as a primary accelerator, and an accelerating substituted ammonium salt of a pentamethylene dithiocarbamic acid, as a secondary accelerator, there being from about 2 to about 50 parts of the primary accelerator to each part of the secondary accelerator.

23. Rubber having incorporated therein, prior to vulcanization, 2-mercapto-thiazoline, as a primary accelerator, and pentamethylene ammonium pentamethylene dithiocarbamate, as a secondary accelerator, there being from about 1 to about 100 parts of the primary accelerator to each part of the secondary accelerator.

24. Rubber having incorporated therein, prior to vulcanization, 2-mercapto-thiazoline, as a primary accelerator, and an accelerating diaryl guanidine salt of a dithiocarbamic acid derived from a secondary amine, as a secondary accelerator, there being from about 2 to about 50 parts of the primary accelerator to each part of the secondary accelerator.

25. Rubber having incorporated therein, prior to vulcanization, 2-mercapto-thiazoline, as a primary accelerator, and the di-phenyl-guanidine salt of pentamethylene dithiocarbamic acid, as a secondary accelerator, there being from about 2 to about 50 parts of the primary accelerator to each part of the secondary accelerator.

BERNARD M. STURGIS.